(12) United States Patent
Mostafa

(10) Patent No.: US 8,073,114 B2
(45) Date of Patent: Dec. 6, 2011

(54) MESSAGE HANDLING

(76) Inventor: Miraj Mostafa, Tampere (FI)

( * ) Notice: Subject to any disclaimer, the term of this patent is extended or adjusted under 35 U.S.C. 154(b) by 1026 days.

(21) Appl. No.: 10/558,659

(22) PCT Filed: Mar. 23, 2005

(86) PCT No.: PCT/FI2005/050106
§ 371 (c)(1),
(2), (4) Date: Oct. 26, 2006

(87) PCT Pub. No.: WO2005/099198
PCT Pub. Date: Oct. 20, 2005

(65) Prior Publication Data
US 2007/0208810 A1 Sep. 6, 2007

(30) Foreign Application Priority Data
Apr. 5, 2004 (FI) .................................. 20040492

(51) Int. Cl.
*H04M 11/00* (2006.01)
(52) U.S. Cl. ............... 379/88.13; 455/412.1; 455/414.1; 455/466
(58) Field of Classification Search ............... 379/88.14, 379/88.13; 455/412.1, 466
See application file for complete search history.

(56) References Cited

U.S. PATENT DOCUMENTS

| | | | | |
|---|---|---|---|---|
| 6,052,440 A * | 4/2000 | Yuhn | ............................ | 379/88.13 |
| 6,496,693 B1 * | 12/2002 | Tran | ............................ | 455/426.1 |
| 6,658,095 B1 * | 12/2003 | Yoakum et al. | ............ | 379/93.01 |
| 6,704,396 B2 * | 3/2004 | Parolkar et al. | ............ | 379/88.17 |
| 6,744,528 B2 * | 6/2004 | Picoult et al. | ................ | 358/1.15 |
| 6,771,749 B1 * | 8/2004 | Bansal et al. | ............... | 379/88.17 |
| 6,947,738 B2 * | 9/2005 | Skog et al. | .................. | 455/426.1 |
| 6,976,082 B1 * | 12/2005 | Ostermann et al. | ........... | 709/231 |
| 7,103,349 B2 * | 9/2006 | Himanen et al. | ........... | 455/412.1 |
| 7,184,764 B2 * | 2/2007 | Raviv et al. | ................ | 455/432.1 |
| 7,248,857 B1 * | 7/2007 | Richardson et al. | .......... | 455/413 |
| 7,299,050 B2 * | 11/2007 | Delaney et al. | ............... | 455/445 |
| 7,310,514 B2 * | 12/2007 | Shinohara | .................. | 455/412.2 |
| 7,342,917 B2 * | 3/2008 | Mohan et al. | ................. | 370/352 |
| 7,496,625 B1 * | 2/2009 | Belcher et al. | ................ | 709/204 |
| 7,522,712 B2 * | 4/2009 | Inon | .......................... | 379/88.26 |

(Continued)

FOREIGN PATENT DOCUMENTS

CN 1377201 10/2002

(Continued)

OTHER PUBLICATIONS

"Wireless Messaging API (WMA) for Java™ 2 Micro Edition", Version 2.0 Proposed Final Draft, Draft 0.10a, Oct. 23, 2003, 78 pgs.

(Continued)

*Primary Examiner* — Simon Sing
(74) *Attorney, Agent, or Firm* — Harrington & Smith

(57) ABSTRACT

The invention relates to handling a message addressed to a client terminal, which client terminal comprises a messaging client for handling said messages. The method comprises the steps of receiving (300) a message addressed to the client terminal, said message comprising content destined to an "upper level" application, the "upper level" application being an application, which is separate from the messaging client, obtaining (301, 204) capability information relating to said client terminal, checking (302, 303, 205)whether said capability information comprises information about "upper level" applications the client terminal supports, and conducting (304, 305) an action responsive to said checking phase.

30 Claims, 3 Drawing Sheets

U.S. PATENT DOCUMENTS

| | | | |
|---|---|---|---|
| 2001/0010685 A1* | 8/2001 | Aho | 370/329 |
| 2002/0044634 A1 | 4/2002 | Rooke et al. | 379/93.01 |
| 2002/0126708 A1 | 9/2002 | Skog et al. | 370/522 |
| 2003/0233461 A1 | 12/2003 | Mariblanca-Nieves et al. | 709/228 |
| 2003/0236892 A1 | 12/2003 | Coulombe | 709/228 |
| 2005/0021834 A1 | 1/2005 | Coulombe | 709/236 |

FOREIGN PATENT DOCUMENTS

| | | |
|---|---|---|
| DE | 102 25 425 A1 | 12/2003 |
| JP | 10254791 A | 9/1998 |
| JP | 2001125824 | 5/2001 |
| JP | 200291840 | 3/2002 |
| WO | WO-96/04752 | 2/1996 |
| WO | WO 98/34422 | 8/1998 |
| WO | WO-00/13427 | 3/2000 |
| WO | WO 00/64110 | 10/2000 |
| WO | WO 02/15601 A2 | 2/2002 |
| WO | WO 02-093959 A1 | 11/2002 |
| WO | WO 2004/112296 A2 | 12/2004 |

OTHER PUBLICATIONS

"Multimedia Messaging Service Client Transactions", Version 1.2, © 2003 Open Mobile Alliance Ltd., 63 pgs.

"WAG UAProf" Proposed Version May 30, 2001, Wireless Application Protocol WAP-248-UAPROF-20010530-p, © 2001, Wireless Application Protocol Forum Ltd., 86 pgs.

3rd Generation Partnership Project; Technical Specification Group Terminals; Multimedia Messaging Service (MMS); Functional description; Stage 2, (Release 5), 3GPP TS 23.140 V5.10.0, Mar. 2004.

* cited by examiner

MESSAGE HANDLING

FIELD OF THE INVENTION

The invention relates to messaging in telecommunication systems, and more particularly to handling a message, such as an MMS (Multimedia Messaging Service) message, addressed to a client terminal.

BACKGROUND OF THE INVENTION

MMS (Multimedia Messaging Service) provides a mechanism to send for example drawings, photographs, music or voice clips and even short video to and from client terminals connected to telecommunication systems. The system is similar to SMS (Short Message Service), which provides possibility to exchange text messages, but MMS can be applied also to other types of content. MMS system operates on the "store and forward" principle with messages being stored and possibly formatted at an MMSC (Multimedia Messaging Service Centre) when sent between users.

An MMS Relay/Server (or MMSC) is a network element or application, which is controlled by the MMS (Multimedia Messaging Service) provider. This element transfers messages, provides specific operations to the mobile environment and provides storage services. In a client terminal, such as mobile phone, MMS messages are handled by an MMS Client module. The MMS Client provides the content of the MMS messages to the presentation layer so that the user can view the content.

The use of MMS for transporting data to/from applications running on top of the MMS Client is under discussion in 3GPP (Third Generation Partnership Project) and Java Community (JSR 205 ExpertGroup) at the time of writing this specification. The proposed system is defined in "Wireless Messaging API (WMA) for Java™ 2 Micro Edition", Version 2.0, Proposed Final Draft, Draft 0.10a, Oct. 23, 2003, JSR 205 Expert Group.

In the proposed system, MMS messages are used as carriers for application data, and the MMS Client is controlled to pass message contents comprising application data to the respective application without processing the content itself and vice versa. Below, the term "upper level" application is used for referring to such application, which runs on top of an operating system, as a separate application from the MMS Client but which uses MMS messages as a carrier for communicating application data. Additional header fields, such as an application ID header field, in MMS message PDU (Protocol Data Unit) are used for identifying the source and target application of the contents of an MMS message. By means of these new header fields the MMS Client is able to identify message content that is destined to an "upper level" application and to forward the content to the right "upper level" application.

The proposed system is expected to be approved for the 3GPP TS 23.140 standard.

SUMMARY OF THE INVENTION

Now, a problem has been identified in the solution proposed by the Java Community. Namely, the solution is not backward compatible with MMS Clients, which do not support the proposed new header fields and "upper level" applications.

As described above, according to the proposal, an MMS Client, which receives a message carrying an application ID header field, is not supposed to process/present such message but to forward the content of the MMS message to the target "upper level" application without any modifications. However, an MMS Client, which is not aware of the new application ID header field, is likely to process/present the message by itself. It is likely that this violates the expected processing/presentation behaviour of the MMS Client and consequently it may result in user irritation or even legal violation for example in relation to copyrighted material.

The problem is expected to be experienced widely during introduction of the "upper level" application support, when most of the MMS Clients that are in use do not support this new feature and thus are not able to correctly handle MMS message content that is destined to an "upper level" application. Especially in person-to-person communications (for example different games) it is likely that the sender does not or is not able to check if the recipient supports "upper level" applications or not.

Additionally, the problem now identified in MMS Client compatibility is likely to exist also in the long run, as it is expected that new applications using MMS as a carrier for communicating application data will be developed continuously. Thus, a situation, in which an MMS Client receives an MMS message comprising a header field with an application ID that it does not recognize (that is, the MMS Client receives content destined to an "upper level" application it does not support), is likely to occur in the future. In that case the MMS Client is unable to forward the content to the right "upper level" application and therefore it is uncertain how the MMS Client behaves in such a situation. So, the solution proposed by the Java Community has problems also in terms of forward compatibility.

This problem is now solved by providing to a network element participating in message delivery, such as MMS Relay/Server, information about, which "upper level" applications the destination user terminal supports, if any, the network element then modifying the message to suit the capabilities of the user terminal, if possible.

Thus, according to a first aspect of the invention, there is provided a method for handling a message addressed to a client terminal, which client terminal comprises a messaging client for handling said messages, wherein the method comprises:
receiving a message addressed to the client terminal, said message comprising content destined to an "upper level" application, the "upper level" application being an application, which is separate from the messaging client,
obtaining capability information relating to said client terminal,
checking whether said capability information comprises information about "upper level" applications the client terminal supports, and
conducting one or more actions responsive to said checking phase.

According to a second aspect of the invention, there is provided a network element for handling a message addressed to a client terminal, which client terminal comprises a messaging client for handling said messages, wherein the network element comprises:
means for receiving a message addressed to the client terminal, said message comprising content destined to an "upper level" application, the "upper level" application being an application, which is separate from the messaging client,
means for obtaining capability information relating to said client terminal,
means for checking whether said capability information comprises information about "upper level" applications the client terminal supports, and means for conducting one or more actions responsive to said checking phase.

The network element according to the invention may be for example an MMS (Multimedia Messaging Service) Relay/Server or an MMSC (Multimedia Messaging Service Centre).

According to a third aspect of the invention, there is provided a signal carrying capability information relating to a client terminal, which comprises a messaging client for handling messages, said capability information comprising information about "upper level" applications the client terminal supports, said "upper level" application being an application, which is separate from the messaging client but which uses messages of the messaging client as a carrier for communicating application data.

Such signal may be provided by a capability information storage element such as a UAProf (User Agent Profile) server or by a client terminal.

According to a fourth aspect of the invention, there is provided a client terminal, which comprises a messaging client for handling messages, wherein the client terminal comprises means for providing information about capabilities of the messaging client, the information about capabilities of the messaging client comprising information about "upper level" applications the client terminal supports, said "upper level" applications being applications, which are separate from the messaging client but which use messages of the messaging client as a carrier for communicating application data.

According to a fifth aspect of the invention, there is provided a system comprising a destination client terminal, which comprises a messaging client for handling messages, and a network element for handling messages addressed to client terminals, said destination client terminal and network element being adapted to communicate with each other through a communication link, wherein the network element comprises:

means for receiving a message addressed to the destination client terminal, said message comprising content destined to an "upper level" application, the "upper level" application being an application, which is separate from the messaging client of the destination client terminal, means for obtaining capability information relating to said destination client terminal, means for checking whether said capability information comprises information about "upper level" applications the destination client terminal supports, and means for conducting one or more actions responsive to said checking means.

According to a sixth aspect of the invention, there is provided a computer program executable in a network element according to claim 28.

According to a seventh aspect of the invention, there is provided a computer program executable in a client terminal element according to claim 30.

Dependent claims relate to certain embodiments of the invention. The subject matter contained in dependent claims relating to a particular aspect of the invention is also applicable to other aspects of the invention.

The present invention provides a messaging system specific (for example MMS specific) solution for backward and forward compatibility issues relating to applications that use MMS (or some other message) as a carrier for communicating application data. Therefore the solution that is presented does not depend on the specific applications. The solutions according to embodiments the invention contribute to improving user experience, as processing/presentation of such content of an MMS message (or some other message), which is not intended to be processed/presented by the MMS Client, is reduced or avoided.

In some embodiments of the invention it is verified that the destination client terminal supports the exact "upper level" application to which message content is destined. Thus, these embodiments are future-proof considering new applications that are developed in the future.

BRIEF DESCRIPTION OF THE DRAWINGS

Embodiments of the invention will now be described by way of example with reference to the accompanying drawings in which.

DETAILED DESCRIPTION

Figure 1:
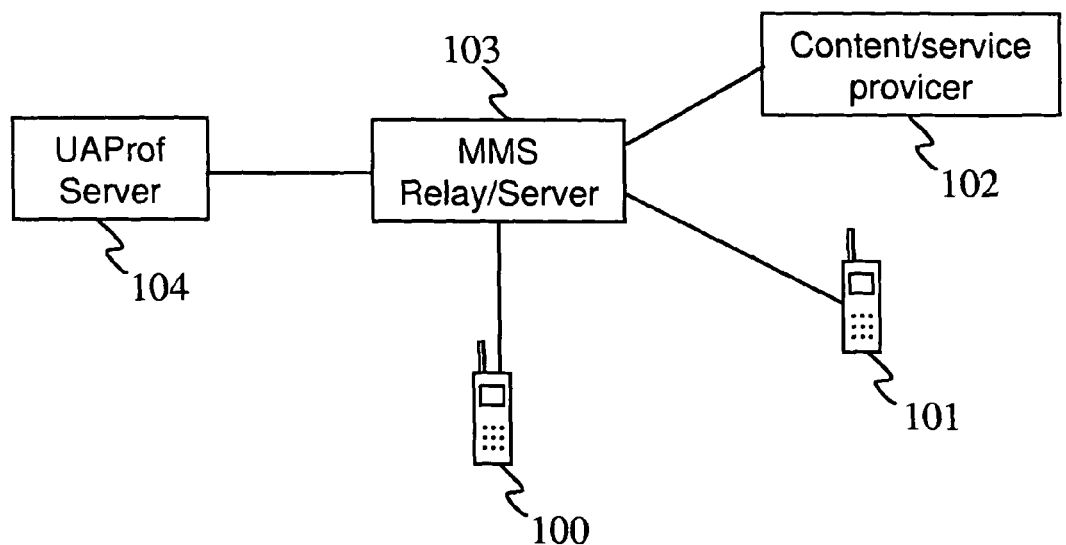
FIG. 1 shows a simplified block diagram of an MMS messaging system.

The invention is described below in connection with MMS messages and "upper level" applications that use or are capable of using MMS as a carrier for communicating application data. However, the invention is not limited only to MMS systems, but it can be used in any other suitable messaging system that employs equivalent "upper level" applications.

One example of the proposed "upper level" applications are Java applications, but the invention can be applied also in relation to any other suitable "upper level" application. Suitable application types include for example native Symbian OS (Operating System) applications, native Microsoft Smartphone applications and applications on a smart card, such as USAT applications (UMTS SIM Application Toolkit).

According to an embodiment of the invention MMS characteristics component of UAProf (User Agent Profile) information is used for indicating, which "upper level" applications a particular MMS Client or client terminal comprising a MMS Client supports and/or whether such "upper level" applications are supported at all. The UAProf specification includes a schema containing attributes that describe for example the client hardware, the browser user agent and network characteristics. Some of the attributes apply to MMS Client characteristics and include attributes like maximum supported size, maximum image resolution, supported content types, supported character sets, supported languages and supported transfer encoding. The use of MMS Characteristics component of the UAProf information is defined for example in "Multimedia Messaging Service Client Transactions", Version 1.2, Candidate Version 16 Sep. 2003, Open Mobile Alliance, OMA-MMS-CTR-v1_2-20030916-C.

According to this embodiment a new attribute (or new attributes) is introduced in the MMS Characteristics component of the UAProf information. The new attributes indicate whether "upper level" applications are supported at all and/or which "upper level" applications are supported. This provides to the network (for example MMS Relay/Server or MMSC) means for knowing if the recipient MMS Client supports the "upper level" application feature (or some application in particular), and thus, the network is able to for example modify, redirect or discard the message or send an error report to the recipient and/or to the sender of the MMS message (depending on the default behaviour of the service provider or user settings in the user profile), if it finds out that the recipient MMS Client does not support the "upper level" application feature or the specific target application.

At least three following alternatives for the new MMS Characteristics component attributes can be identified:
1) One new attribute. The attribute indicates whether the MMS Client supports the feature or not. The type of the attribute is expected to be "Boolean", the possible values for the "Boolean" attribute being true/false or 0/1.
2) One new attribute. Possible values of the attribute are the application IDs corresponding to the "upper level" applications that an MMS Client supports. Existence of any value of application ID means that the MMS Client supports the feature. The attribute is expected to be of "Literal bag" type comprising a list of character strings identifying different applications the user terminal supports.
3) Two new attributes. The first one indicates, whether the MMS Client supports the feature, and the second one lists the values of application IDs corresponding to the applications the user terminal supports. The types of the attributes are respectively "Boolean" and "Literal bag", the possible values for the "Boolean" attribute being true/false or 0/1.

It must be noted that also other attributes, attribute types and/or attribute combinations may be used according to the invention.

FIG. 1 shows a simplified block diagram of an MMS messaging system. The system comprises an MMS Relay/Server, which acts as an intermediate in the transmission of MMS messages between content/service provider 102, client terminal 101 and client terminal 100. The MMS Relay/Server is also coupled to a UAProf Server. It must be noted that the system shown in FIG. 1 is simplified and that practical system comprises variety of other elements. For example the path between the MMS Relay/Server and client terminal comprises typically both fixed line and wireless part and may be implemented by means of variety of different elements. Also other connections shown in FIG. 1 may be routed through different elements in practical systems. The operation of the system in FIG. 1 is further discussed below in connection with FIG. 2.

Figure 2:
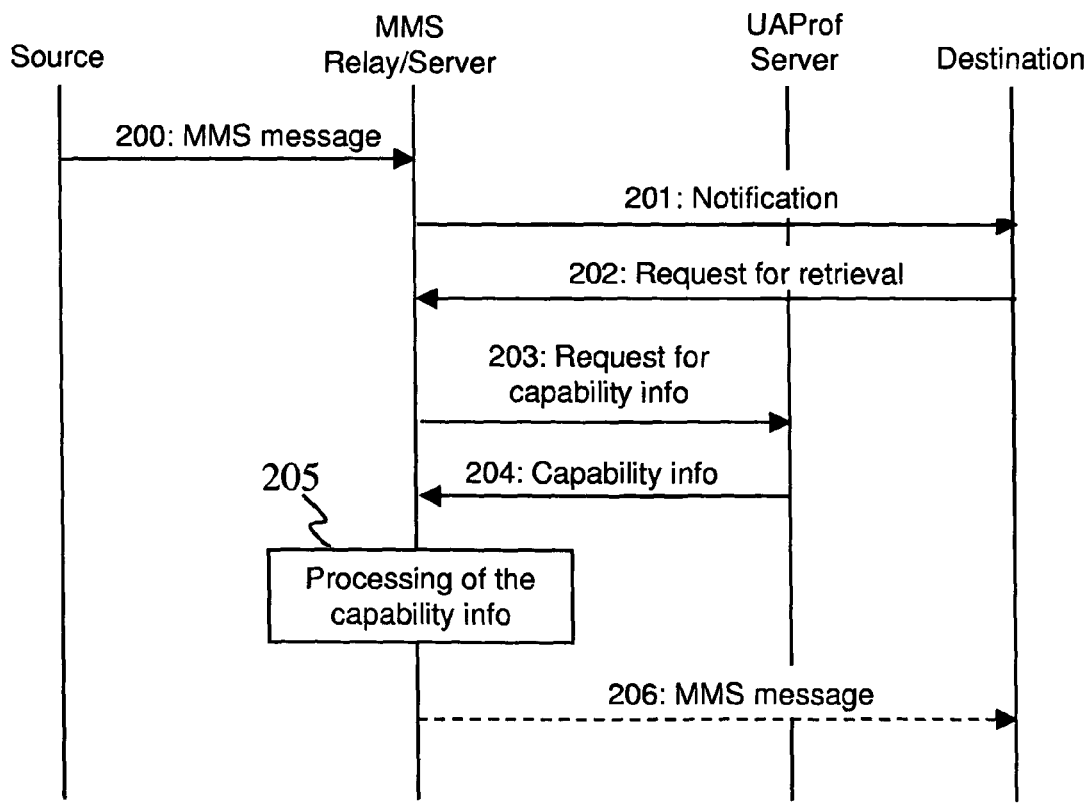
FIG. 2 is a signalling diagram illustrating an embodiment of the invention.

FIG. 2 is a signalling diagram illustrating an embodiment of the invention. An MMS message 200 to be delivered to a Destination is sent from a Source. The Destination may be for example the client terminal 100 of FIG. 1 and the Source may be the client terminal 101 or the content/service provider 103 of FIG. 1.

The MMS message 200 contains content that is destined to an "upper level" application in the Destination. This content may originate from equivalent "upper level" application in the client terminal 101 (MMS Client of the client terminal 101 sends the MMS message) or from the content/service provider system 103.

The MMS message 200 is received at an MMS Relay/Server. After receiving the MMS message, the MMS Relay/Server sends a notification 201 of received MMS message to the Destination. The notification carries information about the received message such as source, subject, class, size, priority and expiry of the message. After receiving the notification 201, the Destination sends (right away or later) a request for retrieval of the MMS message 202 to the MMS Relay/Server. (The use of the notification and request for retrieval messages is basically in accordance with MM1_notification.REQ and MM1_retrieve.REQ messages of a standard MMS implementation.) The request of retrieval contains also capability information identifying capabilities of the Destination devices MMS Client so that the MMS Relay/Server may modify the MMS message to suit the capabilities of the Destination device. The capability information may be for example a pointer to a profile information source element, which is in this case a UAProf Server. The pointer may be for example an URL (Uniform Resource Locator). It is also possible that the MMS Relay/Server already knows the source for the capability information, or that the MMS Relay/Server obtains the capability information from some other means than a specific profile information source element. The capability information may be obtained for example from a static table or derived on the basis of the Destination devices type or model.

The maintenance and updating of the capability information in the UAProf Server is conducted in accordance with prior art methods and thus it is not discussed any further herein.

Figure 3:
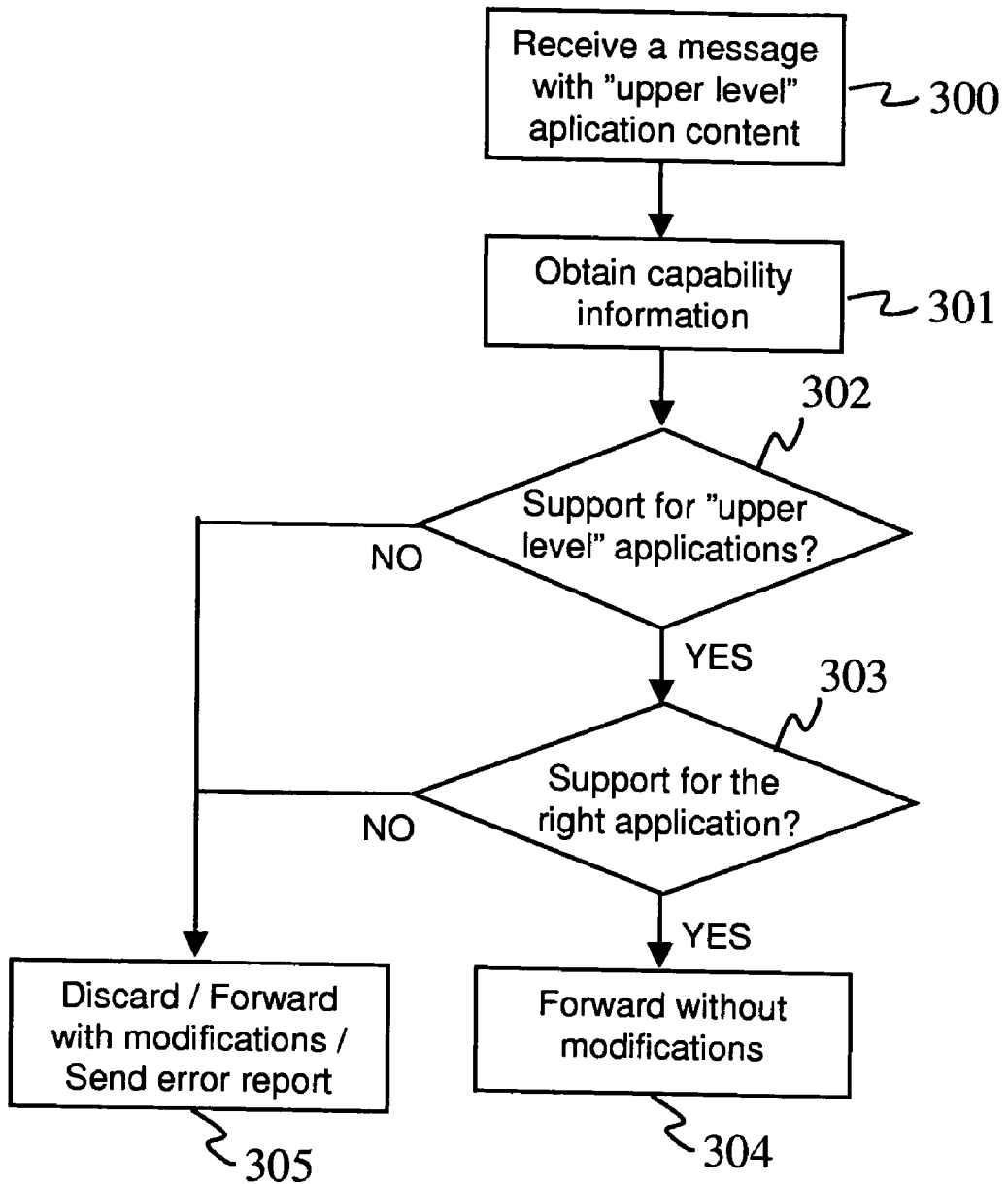
FIG. 3 is a flow diagram illustrating operation of a network element according to an embodiment of the invention.

Once the MMS Relay/Server knows the source for the capability information it sends a request for capability information associated with the Destination 203 to the UAProf Server and the UAProf Server answers with capability information 204. MMS Relay/Server processes the capability information in phase 205. The MMS Relay/Server may have identified that the MMS message or part of its content is destined to an "upper level" application when it first received the MMS message or when it received the request for retrieval message 202 from the Destination or this may happen now in phase 205. On the basis of the capability information and characteristics of the MMS message the MMS Relay/Server then conditionally forwards the MMS message 206 to the Destination either with or without modifications. (However, it is possible that the MMS message is not sent to the Destination at all, if the Destination is not compatible with the content of the MMS message.) Different alternatives for handling messages containing "upper level" application data are further discussed in connection with FIG. 3 below. FIG. 3 is a flow diagram illustrating operation of a network element according to an embodiment of the invention, the network element being a network element, which acts as an intermediate in message transmission, such as an MMS Relay/Server of FIGS. 1 and 2.

First the network element receives a message containing content that is destined to an "upper level" application in a destination device in phase 300. A message is identified to contain such content for example by means of the new header fields introduced in the Java Community proposal discussed above: "Wireless Messaging API (WMA) for Java™ 2 Micro Edition", Version 2.0, Proposed Final Draft, Draft 0.10a, Oct. 23, 2003, JSR 205 Expert Group.

Then, in phase 301, the network element obtains capability information relating to the destination device to which the message in question is destined. As described above in connection with FIG. 2, the network element may ask for the capability information from a suitable source. On the basis of the capability information the network element then checks in phase 302, whether the destination device supports "upper level" applications.

If the destination device does support "upper level" applications, the procedure proceeds to phase 303, in which it is checked, whether the destination device supports the exact application to which the content in the message is destined.

If the destination device does support the right "upper level" application, the message is forwarded to the destination device without any modifications in phase 304. However, when needed, the network element may format the message in a suitable manner, but such formatting is not required because of the "upper level" application content in the message.

If it is concluded in phases 302 or 303 that the destination device does not support "upper level" applications at all or that the destination device does not support the right "upper level" application, respectively, the process proceeds to phase 305. Therein, the message can be either discarded as unsuitable for the destination device or it may be modified so that it suits the destination device and be then forwarded to the destination device. Alternatively, the message may be redirected to some other destination or the network element may simply stop the process of handling the message. The network element may also send an error report to the destination device thus informing the users that somebody is trying to send them content, which is not compliant with the devices they are using. In addition to the destination, or instead of the destination, an error report may be sent also to the source of the message, the source being for example another client terminal or a content provider. (The actual message may be for example discarded in connection with sending an error report.) In addition, the service provider providing MMS messaging services may decide to handle the situation, in which the destination device does not support the destination application, in some other way. Also destination user's (or sender's) user profile or preference/settings in the network or content provider's settings may have an impact on how the messages are handled.

One way of modifying the message in the case that the destination device does not support the right target application is now presented as an example. Even if the client doesn't have the right "upper level" application, there might be some other "upper level" application(s) that might be able to do something with the data contained in the message. For example, if the data contained in the message is XML (eXtended Markup Language) formatted textual data, there is possibility to show it in a normal text editor. Thus the network element may modify the message in phase 305 for example so that it will be delivered to some other "upper level" application that to the one to which it was originally destined.

It must be noted that the flow diagram of FIG. 3 may be altered in any suitable manner. For example phases 302 and 303 may be easily combined into one checking phase depending on the implementation of the capability information. It is also possible that the phase 303 or 302 is completely excluded from the process. Similarly, the behaviour of the MMS Relay/Server, MMSC or other network element in response to the capability information can be kept implementation/service provider specific. Users may be given a possibility to set a preference for handling incompatible message content in their user profile. Possible values for the preference could be for example delete, re-direct or modify the message. Nevertheless, a service provider may want to define what kind of applications it wants to support (person-to-person and/or content provider-to-person). To this end, the service provider may set some default values/options in the user profiles.

Figure 4:
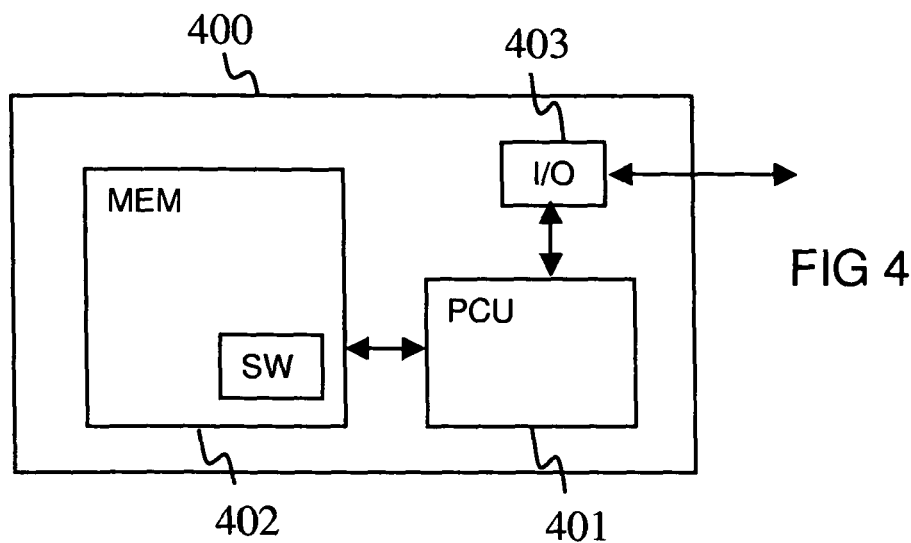
FIG. 4 illustrates a network element according to an embodiment of the invention.

FIG. 4 illustrates a network element 400 according to an embodiment of the invention. Such network element may be for example a MMS Relay/Server or a MMSC or some other network element that stores and forwards messages to client devices.

The network element 400 comprises a processing unit 401 and an input/output module 403 coupled to the processing unit 401. The processing unit 401 is coupled to a memory 402 as well. The memory comprises computer software executable in the processing unit 401.

The processing unit controls, in accordance with the software, the network element to receive a message addressed to a client terminal, the message comprising content destined to an "upper level" application in the client terminal. The network element is controlled to obtain capability information relating to the client terminal, to check whether the capability information comprises application information about "upper level" applications the client terminal supports, and to conduct a specific action responsive to the result of the checking. The specific action that the network element takes may be for example one of the following: modifying the message, discarding the message, redirecting the message, sending an error message and forwarding the message as such or with modifications to the client terminal.

Figure 5:
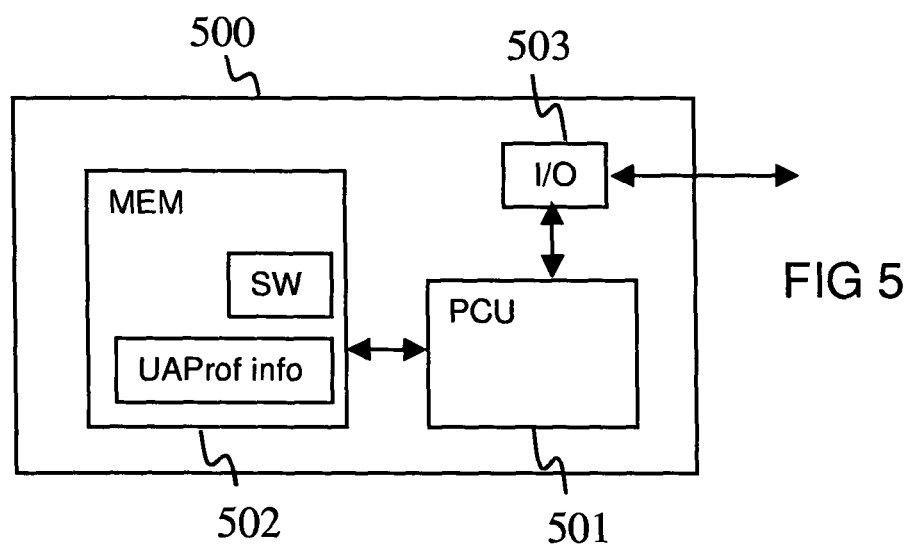
FIG. 5 illustrates a profile information storage element according to an embodiment of the invention.

FIG. 5 illustrates a profile information storage element 500 according to an embodiment of the invention. Such profile information storage element may be for example a UAProf Server.

The profile information storage element 500 comprises a processing unit 501 and an input/output module 503 coupled to the processing unit 501. The processing unit 501 is coupled to a memory 502 as well. The memory comprises computer software executable in the processing unit 501 and UAProf information containing information about capabilities of various client terminals. Specifically the UAProf information in the memory 502 comprises application information about "upper level" applications different client terminals support, the "upper level" applications being applications that use or are capable of using messages of the messaging clients as carriers for communicating application data.

The processing unit controls, in accordance with the software, the profile information storage element to provide capability information of a certain client terminal upon request and specifically, the profile information storage element is controlled to provide, upon request, the application information relating to "upper level" applications associated with a certain client terminal.

Figure 6:
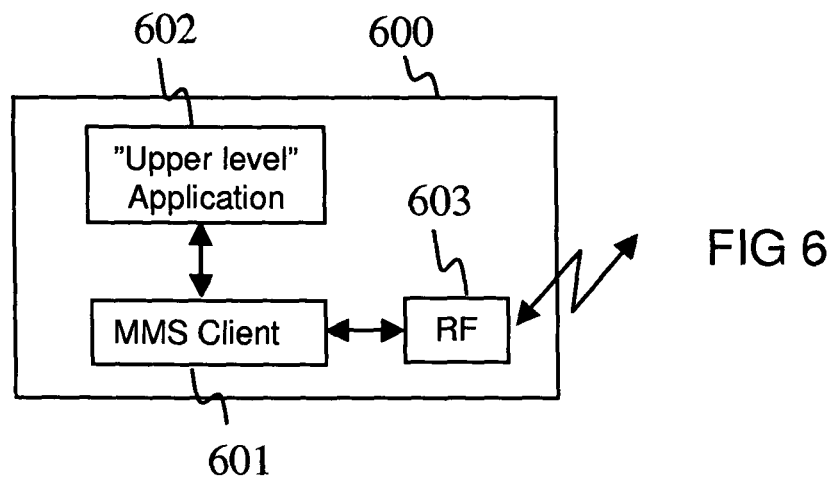
FIG. 6 illustrates a client terminal according to an embodiment of the invention.

FIG. 6 illustrates a client terminal 600 according to an embodiment of the invention. The client terminal may be for example a mobile phone, a personal information device, a laptop provided with communication capabilities or some other communication device.

The client terminal 600 comprises an MMS Client 601, an "upper level" application 602, which uses messages of the MMS Client as a carrier for communicating application data, and a radio frequency part 603. The MMS Client receives and sends data to other devices via the radio frequency part 603 and conveys data to and from the application 602. The client terminal comprises also memory (not shown), a processing unit (not shown), which is responsible for the computation operations executed in the client terminal, a user interface (not shown), which typically comprises a display, a speaker and a keyboard with the aid of which a user can use the client terminal 600.

The memory of the client terminal comprises software executable in the client terminal. The MMS Client of the client terminal is controlled in accordance with the software to provide information about capabilities of the MMS Client, the information comprising information about "upper level" applications the client terminal supports. The information may be given for example as a pointer to a profile information storage or as readily usable capability information.

Particular implementations and embodiments of the invention have been described above. It is clear to a person skilled in the art that the invention is not restricted to details of the embodiments presented above, but that it can be implemented in other embodiments using equivalent means without deviating from the characteristics of the invention. The scope of the invention is only restricted by the attached patent claims.

The invention claimed is:

1. A method comprising:
receiving a multimedia message addressed to a client terminal, said multi-media message comprising content destined to an upper level application, the upper level application being an application, which is separate from a multimedia messaging client configured to handle said multimedia message and which uses multimedia messages of the multimedia messaging client as a carrier for communicating application data,
obtaining capability information relating to said client terminal,
checking whether said capability information comprises information about upper level applications the multimedia messaging client of the client terminal supports, and
conducting one or more actions responsive to said checking phase.

2. A method according to claim 1, wherein obtaining capability information comprises:
receiving, from the client terminal, a pointer to a profile information storage, and
retrieving said capability information from said profile information storage.

3. A method according to claim 1, wherein obtaining capability information comprises:
receiving capability information from the client terminal.

4. A method according to claim 1, wherein said action comprises at least one of the following: modifying the message, discarding the message, redirecting the message, sending an error report and forwarding the message as such or with modifications to the client terminal.

5. A method according to claim 1, wherein said action comprises at least one of the following, if said multimedia messaging client of the client terminal does not support any upper level applications: forwarding the message to the client terminal with modifications, redirecting the message, sending an error report and discarding the message.

6. A method according to claim 1, wherein said action comprises at least one of the following, if said multimedia messaging client of the client terminal does not support the specific upper level application to which said message content is destined: forwarding the message to the client terminal with modifications, redirecting the message, sending an error report and discarding the message.

7. A method according to claim 1, wherein said action comprises one of the following, if said multimedia messaging client of the client terminal does support some upper level application: forwarding the message as such to the client terminal and forwarding the message to the client terminal with modifications.

8. A method according to claim 1, wherein said action is forwarding the message as such to the client terminal, if said multimedia messaging client of the client terminal does support the specific upper level application to which said message content is destined.

9. A method according to claim 1, wherein said message originates from another upper level application.

10. A method according to claim 1, wherein said message originates from a content/service provider system.

11. A method according to claim 1, wherein said upper level application is one of the following: a Java® application, a native Symbian® OS application, a native Microsoft® Smartphone application and an application on a smart card.

12. A method according to claim 1, wherein said message is a multimedia messaging service message.

13. A method according to claim 1, wherein said capability information is user agent profile information.

14. A method according to claim 1, wherein said information about upper level applications comprises a Literal bag type attribute comprising application identifiers of the upper level applications the multimedia messaging client of the client terminal supports.

15. A method according to claim 1, wherein said information about upper level applications comprises a Boolean type attribute indicating, whether the messaging client of the client terminal supports upper level applications or not.

16. A method according to claim 1, wherein said information about upper level applications comprises a Boolean type attribute indicating, whether the messaging client of the client terminal supports upper level applications or not, and conditionally a Literal bag type attribute comprising application identifiers of the upper level applications the client terminal supports.

17. An apparatus comprising:
an input configured to receive a multimedia message addressed to a client terminal, said multimedia message comprising content destined to an upper level application, the upper level application being an application, which is separate from a multimedia messaging client configured to handle said multimedia message and which uses messages of the multimedia messaging client as a carrier for communicating application data,
a processing unit configured to control the apparatus to obtain capability information relating to said client terminal, check whether said capability information comprises information about upper level applications the multimedia messaging client of the client terminal supports, and
conduct one or more actions responsive to said check.

18. An apparatus according to claim 17, wherein said apparatus is a multimedia messaging service relay/server or a multimedia messaging service center.

19. An apparatus according to claim 17, wherein the input is configured to receive a pointer to a profile information storage, and said processing unit is configured to control the network element to retrieve said capability information from said profile information storage.

20. An apparatus according to claim 17, wherein said action comprises at least one of the following: modifying the message, discarding the message, redirecting the message, sending an error report and forwarding the message as such or with modifications to the client terminal.

21. A client terminal comprising:
a multimedia messaging client configured to handle messages,
a processing unit configured to control the client terminal to provide information about capabilities of the multimedia messaging client, the information about capabilities of the multimedia messaging client comprising information about upper level applications the multimedia messaging client of the client terminal supports, said upper level applications being applications, which are separate from the multimedia messaging client and which use multimedia messages of the multi-media messaging client as a carrier for communicating application data.

22. A client terminal according to claim 21, wherein said processing unit is configured to control the client terminal to give said information about capabilities of the messaging client as a pointer to a profile information storage.

23. A client terminal according to claim 21, wherein said processing unit is configured to control the client terminal to give said information about capabilities of the messaging client as readily usable capability information.

24. A system comprising a destination client terminal, which comprises a multimedia messaging client configured to handle multimedia messages, and a network element configured to handle multimedia messages addressed to client terminals, said destination client terminal and network element being adapted to communicate with each other through a communication link, wherein the network element comprises:
- means for receiving a multimedia message addressed to the destination client terminal, said multimedia message comprising content destined to an upper level application, the upper level application being an application, which is separate from the multimedia messaging client of the destination client terminal and which uses multimedia messages of the multimedia messaging client as a carrier for communicating application data,
- means for obtaining capability information relating to said multimedia messaging client of the destination client terminal,
- means for checking whether said capability information comprises information about upper level applications the multimedia messaging client of the destination client terminal supports, and
- means for conducting one or more actions responsive to said checking means.

25. A system according to claim 24, wherein the destination client terminal comprises means for providing information about capabilities of the messaging client, the information about capabilities of the messaging client comprising information about upper level applications the multimedia messaging client of the destination client terminal supports.

26. A system according to claim 25, wherein the system further comprises
- a profile information storage element, and wherein
- said means for providing information in the destination client terminal are configured to give said information about capabilities of the messaging client as a pointer to said profile information storage element, said profile information storage element comprising
  - a memory for storing capability information relating to messaging clients of different client terminals, and
  - means for providing capability information of a multimedia messaging client of a certain client terminal upon request,
- said means for obtaining capability information in the network element being configured
  - to receive said pointer to said profile information storage element from said destination client terminal and
  - to request capability information relating to the destination client terminal from said profile information storage element.

27. A system according to claim 24, wherein the system further comprises a source client terminal comprising:
- a messaging client, and
- at least one upper level application,
- said messaging client being configured to send a message comprising content, which originates from said at least one upper level application and is destined to an upper level application in the destination client terminal.

28. A system according to claim 24, wherein the system further comprises a content/service provider comprising
- means for sending message comprising content, which is destined to an upper level application in the destination client terminal.

29. A computer program executable in a network element, the computer program providing a routine for handling a multimedia message addressed to a client terminal, wherein the computer program controls the network element to:
- receive a multimedia message addressed to the client terminal, said multimedia message comprising content destined to an upper level application, the upper level application being an application, which is separate from the multimedia messaging client configured to handle said multimedia message and which uses multimedia messages of the multimedia messaging client as a carrier for communicating application data,
- obtain capability information relating to said client terminal,
- check whether said capability information comprises information about upper level applications the multimedia messaging client of the client terminal supports, and
- conduct an action responsive to said checking.

30. A computer program executable in a client terminal, which comprises a multimedia messaging client configured to handle messages, wherein the computer program is configured to control the client terminal to provide information about capabilities of the messaging client, the information about capabilities of the multimedia messaging client comprising information about upper level applications the multimedia messaging client of the client terminal supports, said upper level applications being applications, which are separate from the multimedia messaging client and which use multimedia messages of the multimedia messaging client as a carrier for communicating application data.

* * * * *